(12) United States Patent
Takeyama et al.

(10) Patent No.: US 10,550,806 B2
(45) Date of Patent: Feb. 4, 2020

(54) SENSOR ARRANGEMENT OF INTERNAL COMBUSTION ENGINE

(71) Applicant: HONDA MOTOR CO., LTD., Tokyo (JP)

(72) Inventors: Yusuke Takeyama, Wako (JP); Katsushi Hashimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 16/027,544

(22) Filed: Jul. 5, 2018

(65) Prior Publication Data

US 2019/0010900 A1 Jan. 10, 2019

(30) Foreign Application Priority Data

Jul. 5, 2017 (JP) ................................ 2017-132239

(51) Int. Cl.
*F02M 35/10* (2006.01)
*F02D 9/02* (2006.01)
*F02B 29/04* (2006.01)

(52) U.S. Cl.
CPC ......... *F02M 35/1038* (2013.01); *F02B 29/04* (2013.01); *F02D 9/02* (2013.01); *F02M 35/10006* (2013.01); *F02D 2009/0228* (2013.01); *F02D 2200/0406* (2013.01)

(58) Field of Classification Search
CPC .... G01F 5/00; G01F 1/684; F02D 2200/0406; F02D 41/18
USPC .................................................. 123/184.21
See application file for complete search history.

(56) References Cited

U.S. PATENT DOCUMENTS

| | | | | |
|---|---|---|---|---|
| 4,489,595 | A * | 12/1984 | Klomp ................... | G01L 23/24 73/114.37 |
| 7,168,334 | B1 * | 1/2007 | Drott .................... | G01N 33/487 604/31 |
| 7,367,320 | B2 | 5/2008 | Komori et al. | |
| 9,828,923 | B2 * | 11/2017 | Toda ....................... | F02D 41/18 |
| 10,006,382 | B2 * | 6/2018 | Tsunooka ............. | F02B 37/183 |
| 2010/0065013 | A1 * | 3/2010 | Weber ................. | G01L 19/0023 123/195 R |
| 2015/0184582 | A1 * | 7/2015 | Kondo ................ | F02D 41/1456 123/674 |
| 2017/0184012 | A1 * | 6/2017 | Maruo .................. | F02B 37/186 |
| 2018/0298810 | A1 * | 10/2018 | Ono ........................ | F02B 37/18 |

FOREIGN PATENT DOCUMENTS

| | | |
|---|---|---|
| JP | 2003-500146 A | 1/2003 |
| JP | 2010-512519 A | 4/2010 |
| JP | 4574576 B2 | 11/2010 |
| JP | 2013-164006 A | 8/2013 |
| WO | 2015075944 A1 | 5/2015 |

OTHER PUBLICATIONS

Japanese Office Action dated Dec. 4, 2018, 4 pages.

* cited by examiner

*Primary Examiner* — Long T Tran
*Assistant Examiner* — James J Kim
(74) *Attorney, Agent, or Firm* — Rankin, Hill & Clark LLP

(57) ABSTRACT

A sensor arrangement of an internal combustion engine includes an intake duct including one or more curved parts bent or curved and connecting an intercooler and a throttle; and a pressure sensor provided on the intake duct and configured to detect a pressure in the intake duct. The pressure sensor includes a detector disposed close to an outside curved portion of a curved part.

5 Claims, 12 Drawing Sheets

SENSOR ARRANGEMENT OF INTERNAL COMBUSTION ENGINE

CROSS-REFERENCE TO RELATED APPLICATIONS

The present application claims priority under 35 U.S.C. § 119 to Japanese Patent Application No. 2017-132239, filed on Jul. 5, 2017. The contents of this application are incorporated herein by reference in their entry.

BACKGROUND OF THE INVENTION

1. Field of the Invention

The present invention relates to a sensor arrangement of an internal combustion engine.

2. Description of the Related Art

In a well-known conventional sensor arrangement of an internal combustion engine, a pressure sensor is installed in the middle of a piping of an intake system (e.g., see Japanese Patent No. 4574576).

SUMMARY OF THE INVENTION

The conventional sensor arrangement of the internal combustion engine has the following problem. When high pressure intake is performed or the throttle valve is suddenly closed, intake air flow backward in the piping and the pressure sensor is subjected to a dynamic pressure. Therefore, an accurate pressure cannot be detected.

The present invention is directed to a sensor arrangement of an internal combustion engine which accurately detects a pressure.

The present invention is a sensor arrangement of an internal combustion engine. The sensor arrangement includes an intake duct including one or more curved parts bent or curved and connecting an intercooler and a throttle; and a pressure sensor provided on the intake duct and configured to detect a pressure in the intake duct. The pressure sensor includes a detector disposed close to an outside curved portion of a curved part.

According to the present invention, the sensor arrangement of the internal combustion engine achieves accurate detection of pressure.

DETAILED DESCRIPTION OF THE EMBODIMENTS

Embodiments of the present invention will be hereinafter described in detail with reference to the accompanying drawings. The same constituents are denoted by the same reference sign to avoid duplicated descriptions. Unless otherwise mentioned, directions are basically described based on front and rear, right and left, and up and down seen from a driver. A "vehicle-width direction" is synonymous with a "horizontal direction." In the embodiments, a vertical direction V is a direction substantially parallel to a cylinder axial direction.

Figure 1:
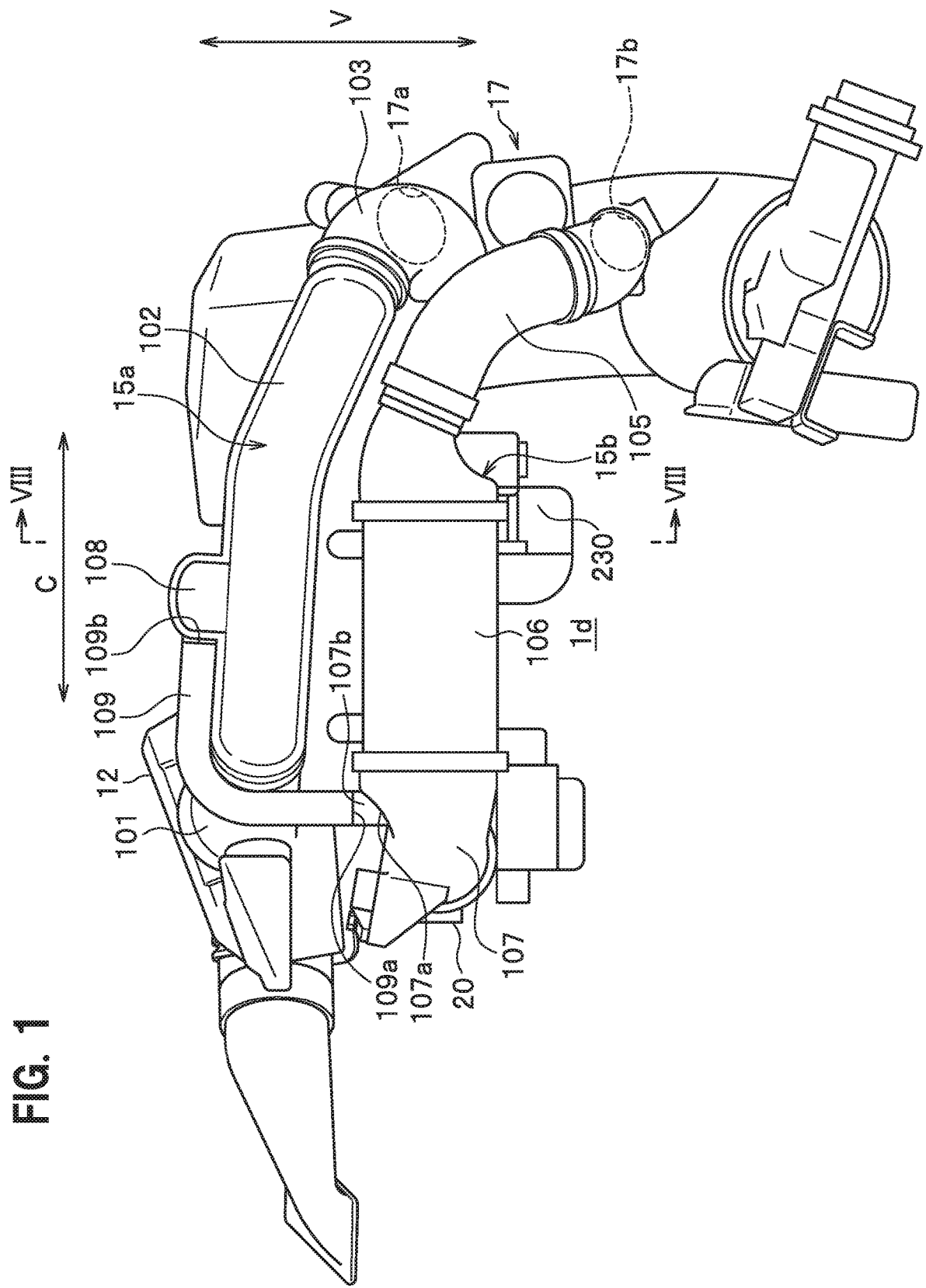
FIG. 1 is a side view of a peripheral structure of engine according to an embodiment of the present invention, the view illustrating a configuration on top of an engine main body mounted in an engine room seen from an I direction in FIG. 2.
Figure 2:
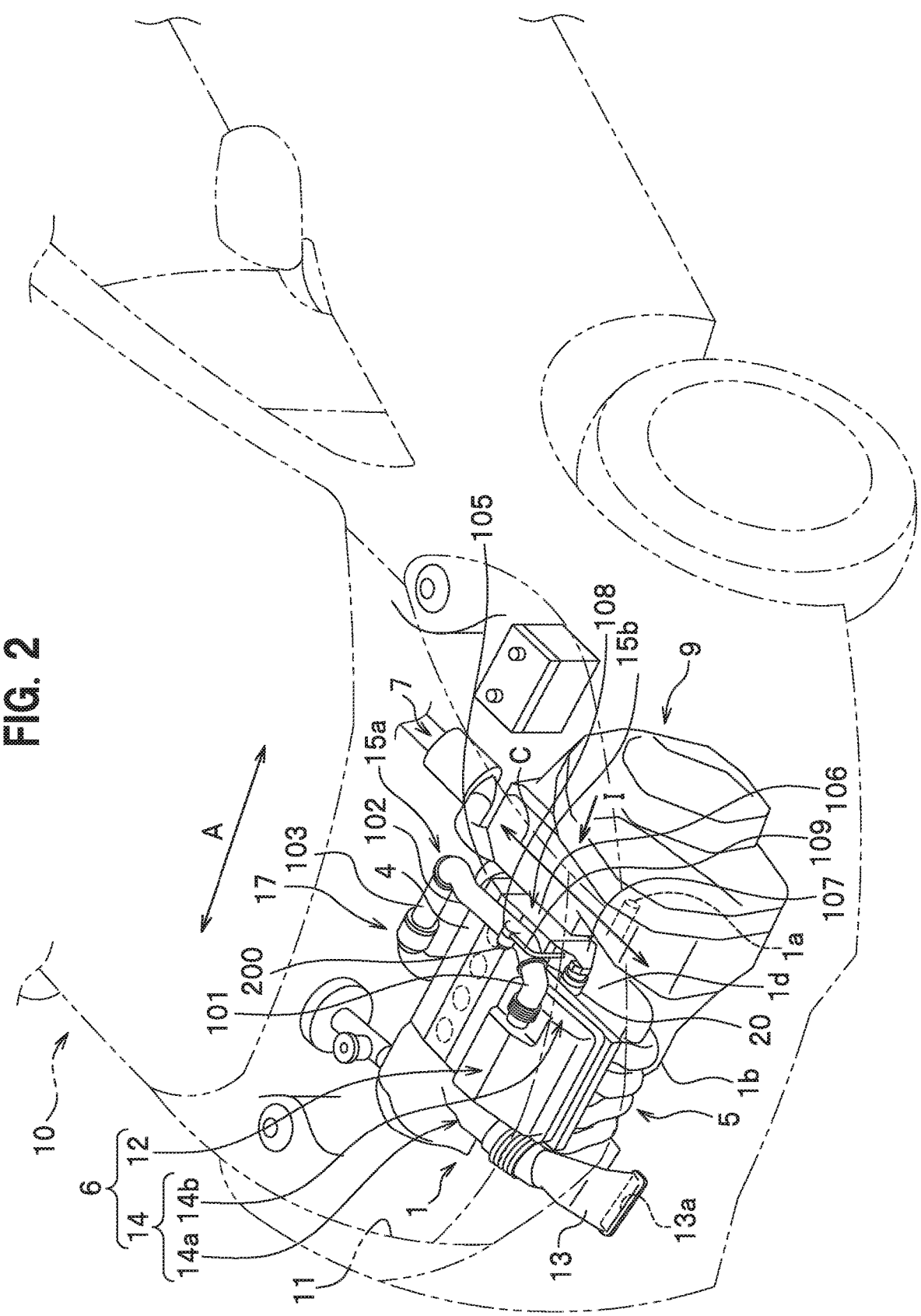
FIG. 2 is a perspective see-through view of the peripheral structure of engine, the view illustrating the inside of the engine room of a vehicle from a front side of the vehicle in a diagonal direction.

As illustrated in FIGS. 1 to 4, an engine room 11 formed in a front part of a vehicle 10 of this embodiment is mounted with an engine main body 1 (see FIG. 2). The engine main body 1 mainly includes a cylinder block 2, a cylinder head 3, and a cylinder head cover 4 (see FIG. 3).

The cylinder block 2 of the engine main body 1 is provided with multiple cylinders. The engine main body 1 of this embodiment is provided with four cylinders.

For illustrative purposes, a direction in which the multiple cylinders linearly arranged in the cylinder block 2 is hereinafter called a cylinder arrangement direction A (see FIG. 2).

This cylinder block 2 is provided with an output shaft 1a protruding therefrom. In this case, the axial direction of the output shaft 1a coincides with the cylinder arrangement direction A. The output shaft 1a is coupled to a transmission unit or hybrid unit 9 arranged next to the engine main body 1. The transmission unit or hybrid unit 9 transmits a rotary driving force to traveling wheels via an unillustrated driving shaft.

When the engine main body 1 of this embodiment is in a vehicle-mounted state, the cylinder arrangement direction A, which coincides with the direction of the output shaft 1a, is also the vehicle-width direction. The cylinder arrangement direction A is thus orthogonal to the vehicle front-rear direction.

The cylinder arrangement direction A is not particularly limited and, for example, may be provided along the vehicle front-rear direction in an inline four-cylinder or an inline six-cylinder, or may be provided in a cylinder with a tilted axial direction.

The side surface 1b on the intake side of the cylinder head 3 is provided with a resin intake manifold 5. This resin intake manifold 5 is connected with an intake system 6.

The intake system 6 mainly includes an air cleaner 12 provided on the top surface side of the engine main body 1, an intake opening member 13 having an intake port 13a, an intake passage 14 for introducing the air, which is drawn by the intake opening member 13 and passes through the air cleaner 12, into the resin intake manifold 5, a supercharger 17 provided in the middle of the intake passage 14 (see FIG. 4), and an intercooler 106 as a heat exchanger (see FIG. 2).

The intake opening member 13 forms the intake port 13a as an opening in the vehicle front side. The intake opening member 13 draws the air from the intake port 13a and introduces the air into the intake passage 14. The intake passage 14 introduces the intake air into the resin intake manifold 5 provided in the engine main body 1 via the air cleaner 12.

The intake passage 14 has a first intake passage 14a and a second intake passage 14b.

Out of these, the first intake passage 14a introduces the air drawn from the intake port 13a of the intake opening member 13 into the air cleaner 12. The second intake passage 14b is configured to introduce the air from the air cleaner 12 into the resin intake manifold 5 in the engine main body 1 via the supercharger 17, the intercooler 106, and a throttle valve 20.

As illustrated in FIG. 1, the second intake passage 14b includes the supercharger 17, a low-pressure intake passage 15a connected to a part upstream of the supercharger 17 in an intake direction, a high-pressure intake passage 15b connected to a part downstream of the supercharger 17 in the intake direction, and the throttle valve 20.

Out of these, the low-pressure intake passage 15a has a first connection member 101 with one end connected to the air cleaner 12, an upper piping 102 connected to the other end of the first connection member 101, and a second connection member 103.

The first connection member 101 is formed to be curved and allows an internal space of the air cleaner 12 and an internal space of the upper piping 102 to communicate with each other.

A pipe diameter of the upper piping 102 is substantially the same as those of the first connection member 101 and the second connection member 103.

A later-described air bypass valve 200 is provided on a top surface side of this upper piping 102.

In addition, one end of the second connection member 103 is connected to the upper piping 102 and the other end thereof is connected to a compressor entry side opening 17a of the supercharger 17.

In this way, the air cleaner 12 communicates with the supercharger 17 via the first connection member 101, the upper piping 102, and the second connection member 103.

In the intake system 6, the high-pressure intake passage 15b turns back to the low-pressure intake passage 15a at the supercharger 17. The low-pressure intake passage 15a and the high-pressure intake passage 15b are arranged near a left side surface 1d of the engine main body 1. At least a part of each of these low-pressure intake passage 15a and the high-pressure intake passage 15b extends to coincide with each other in the vertical direction V (a direction substantially parallel to the cylinder axial direction).

As illustrated in FIG. 1, the high-pressure intake passage 15b of this embodiment is positioned on the left side surface 1d of the engine main body 1 and is arranged below the low-pressure intake passage 15a along a vehicle front-rear direction C to be substantially parallel to the low-pressure intake passage 15a.

In addition, in this embodiment, the low-pressure intake passage 15a and the high-pressure intake passage 15b are positioned above the transmission unit or hybrid unit 9 arranged next to the left side surface 1d of the engine main body 1.

The high-pressure intake passage 15b has a third connection member 105, a fourth connection member 107, and the intercooler 106 interposed between these third connection member 105 and fourth connection member 107.

Out of these, the third connection member 105 is formed to be curved, and one end thereof is connected to the compressor exit side opening 17b of the supercharger 17. The other end of the third connection member 105 is connected to the intercooler 106.

The fourth connection member 107 is connected to the other end side opening of the intercooler 106. The fourth connection member 107 has an internal passage shape that allows an air passage direction to have a substantially right angle from the vehicle front-rear direction C to the cylinder arrangement direction A (see FIG. 12).

The end of the fourth connection member 107 on the downstream side is connected to the throttle valve 20.

In this embodiment, the position of the fourth connection member 107 in the vertical direction V at the exit of the intercooler 106 is set to the same height of the position of the throttle valve 20 provided on the engine main body 1 in the vertical direction V.

In addition, the intercooler 106 is provided with an unillustrated refrigerant passage. The heat is exchanged between the refrigerant flowing through the refrigerant passage and the air flowing through the intercooler 106. The intercooler 106 thus can cool down the intake air compressed by the supercharger 17 before introducing the air into the engine main body 1 from the throttle valve 20.

Figure 3:
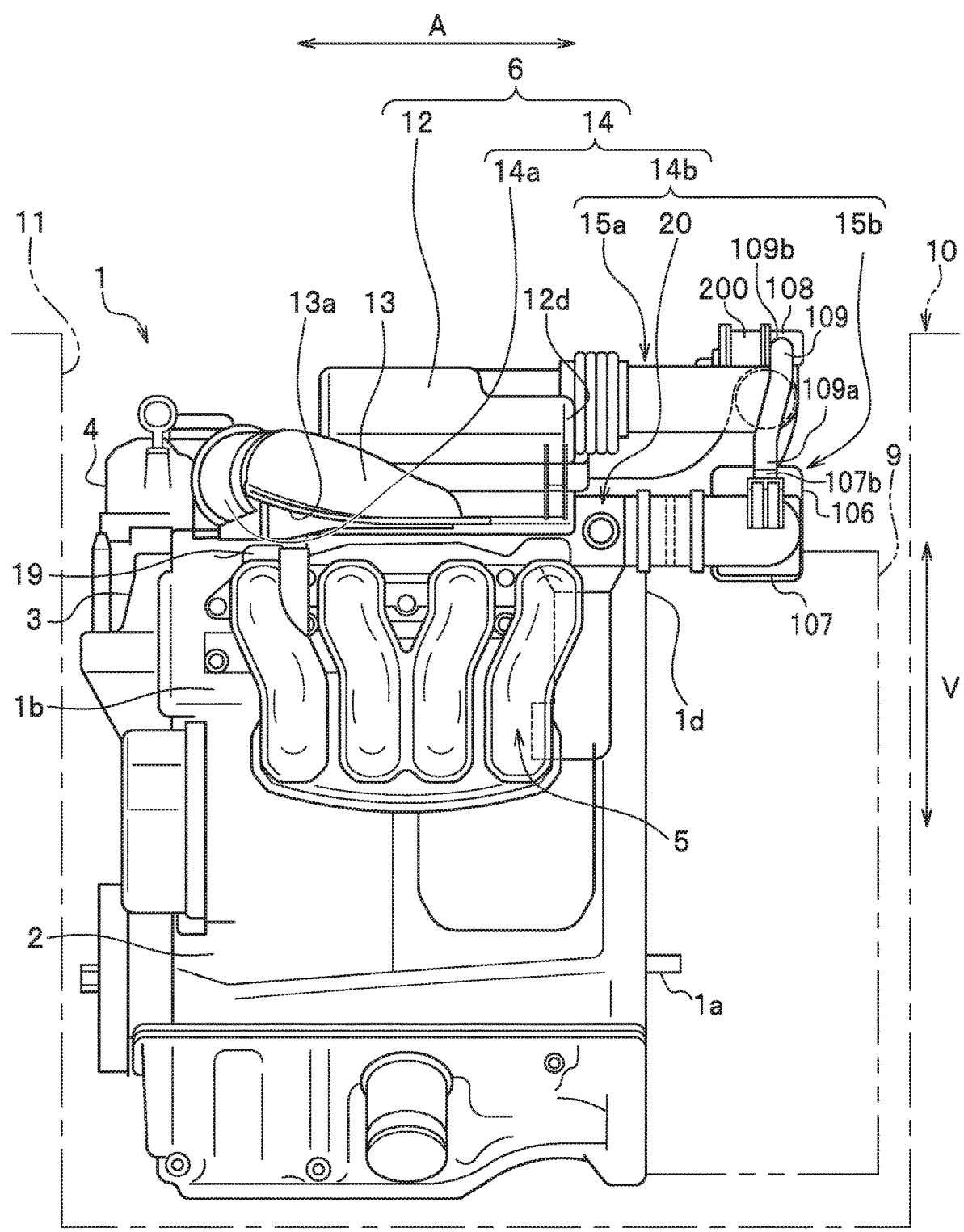
FIG. 3 is a front view of the peripheral structure of engine, the view illustrating a configuration of the engine main body mounted in the engine room seen from the front side of the vehicle.

As illustrated in FIG. 3, the low-pressure intake passage 15a has the air bypass valve 200 in a part where the low-pressure intake passage 15a overlaps the high-pressure intake passage 15b in a top view.

In a longitudinal direction of the low-pressure intake passage 15a, a chamber 108 is integrally formed on a top surface portion of the low-pressure intake passage 15a to be bulged near the first connection member 101.

The high-pressure intake passage 15b is provided with a bypass piping 109. That is, a top surface portion 107a of the fourth connection member 107 is provided with a branch pipe 107b protruding therefrom. One end 109a of the bypass piping 109 is connected to this branch pipe 107b, and the other end 109b of the bypass piping 109 is connected to the chamber 108.

The internal space of the fourth connection member 107 thus communicates with an internal space of the chamber 108. Note that, in this embodiment, the bypass piping 109 is routed to overlap the high-pressure intake passage 15b in the top view.

The air in the high-pressure intake passage 15b is introduced into a high-pressure side compartment of the air bypass valve 200 via these bypass piping 109 and chamber 108.

That is, the air bypass valve 200 is opened to make the high-pressure intake air circulate from the air bypass valve 200 into the low-pressure intake passage 15a.

In this way, the high-pressure intake air circulates into the low-pressure intake passage 15a through the bypass piping 109 and the chamber 108 without a backflow in a direction of the intercooler 106.

Since there is no backflow to the supercharger 17, no surge phenomenon of the supercharger 17 occurs. This can protect the supercharger 17 and the intercooler 106 by reducing the loads on them, and accordingly the occurrence of the surge sound can be inhibited.

Figure 4:
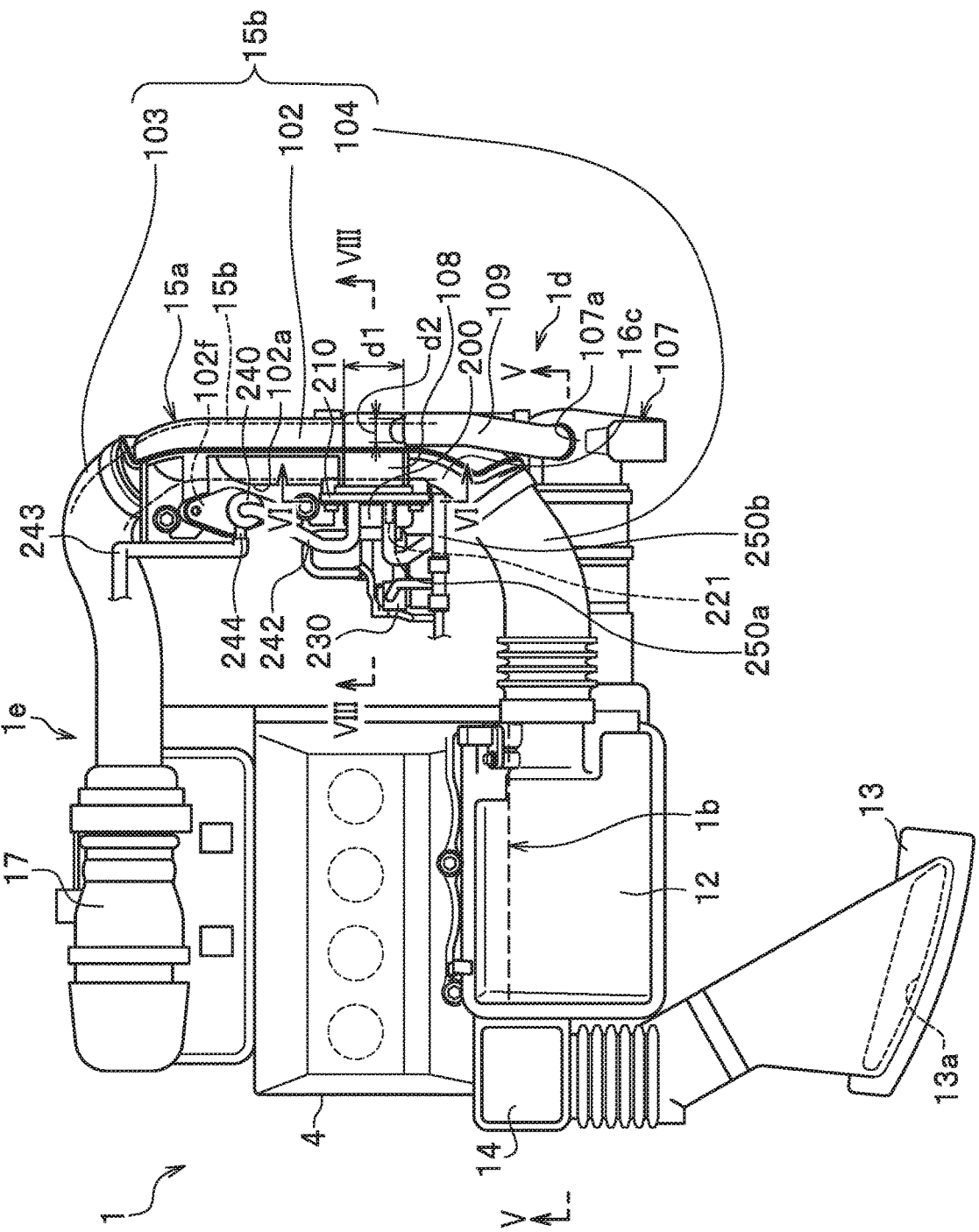
FIG. 4 is a top view of the peripheral structure of engine, the view illustrating a configuration of the engine main body mounted in the engine room seen from above the vehicle.

In this embodiment, the low-pressure intake passage 15a and the high-pressure intake passage 15b extend such that the whole parts thereof overlap each other in the top view of the engine room 11 (see FIG. 4).

More specifically, as illustrated in FIG. 4, in almost the entire region on the left side in the top view of the engine room 11, the low-pressure intake passage 15a and the high-pressure intake passage 15b extend in a substantially square C-shape which includes the left side surface 1d in the middle, such that almost the whole parts thereof from the side surface 1d on the intake side to a side surface 1e on the outlet side coincide with each other.

According to such a configuration of the peripheral structure of engine of this embodiment, the air drawn by the intake port 13a of the intake opening member 13 flows through the second intake passage 14b and the supercharger 17 via the first intake passage 14a and the air cleaner 12, be cooled down by the intercooler 106, and passes through the throttle valve 20. The air that passed through the throttle valve 20 is then introduced into the engine main body 1 from the resin intake manifold 5 via an unillustrated surge tank.

Next, operations and effects of the peripheral structure of engine of this embodiment are described.

According to such a configuration of the vehicle 10 of this embodiment, as illustrated in FIGS. 1 to 3, the low-pressure intake passage 15a and the high-pressure intake passage 15b extend such that at least a part of each of them overlaps the other in the top view of the engine room 11.

The low-pressure intake passage 15a and the high-pressure intake passage 15b are thus compactly laid out in the front-rear direction or the horizontal direction on the left side surface 1d of the engine main body 1.

The intercooler 106 is provided in the high-pressure intake passage 15b positioned on the left side surface 1d of the engine main body 1.

This provision makes setting of the piping for the refrigerant provided for the intercooler 106 easier and makes the layout more compact than in a case where the intercooler 106 is provided in different position.

In particular, a liquid-cooled or water-cooled intercooler 106 is easier to downsize than an air-cooled heat exchanger. For example, water piping for the intercooler 106 is easier than piping for an intercooler provided near a radiator in the front part of the engine main body 1.

The heights of the fourth connection member 107 positioned at the exit portion of the intercooler 106 and the throttle valve 20 become the same. This can minimize a distance that the air cooled down by the intercooler 106 reaches the throttle valve 20, and thus the response of the engine main body 1 can be improved.

In this embodiment, the low-pressure intake passage 15a has the air bypass valve 200 in the part where the low-pressure intake passage 15a overlaps the high-pressure intake passage 15b in the top view. The second intake passage 14b introduces the air from the air cleaner 12 into the engine main body 1 via the supercharger 17, the intercooler 106, and the throttle valve 20. When the throttle valve 20 is suddenly closed, the air bypass valve 200 is opened to circulate the high-pressure intake air into the low-pressure intake passage 15a, and thereby protects the intercooler 106.

The high-pressure intake passage 15b is routed so as to overlap the bypass piping 109, which connects and communicates with the air bypass valve 200, in the top view.

As illustrated in FIG. 1, the fourth connection member 107 of the high-pressure intake passage 15b is connected to the above chamber 108 in a short piping distance via the bypass piping 109. Thus, the layout can be further compact.

In addition, in this embodiment, as illustrated in FIG. 4, in the top view of the engine room 11, the low-pressure intake passage 15a and the high-pressure intake passage 15b extend from the side surface 1d to the side surface 1e on the outlet side such that almost the whole parts thereof coincide with each other in the substantially square C-shape.

In this way, the low-pressure intake passage 15a and the high-pressure intake passage 15b can reduce the outward protrusion from the engine main body 1 by overlapping each other in the vertical direction on not only the left side surface 1d but also on the side surface 1b on the intake side and the side surface 1e on the outlet side.

Thus, the layout of the piping of the intake system 6 can be much more compact.

In particular, in this embodiment, the low-pressure intake passage 15a and the high-pressure intake passage 15b provided with the minimized liquid-cooled intercooler 106 extend such that the whole parts thereof coincide with each other in the top view of the engine room 11 (see FIG. 4).

Thus, as illustrated in FIG. 3, the transmission unit or hybrid unit 9 can be mounted using a space below the intercooler 106, and this can implement much more compact layout in the engine room 11.

This embodiment includes the engine main body 1 mounted in the engine room 11, the intake system 6 connected to the engine main body 1, and the supercharger 17 provided in the middle of the intake system 6. The intake system 6 includes the low-pressure intake passage 15a connected to the part upstream of the supercharger 17 in the intake direction, and the high-pressure intake passage 15b connected to the part downstream of the supercharger 17 in the intake direction. In the intake system 6 on the side surface of the engine main body 1 that is substantially parallel to the cylinder axial direction of the engine main body 1, at least a part of each of the low-pressure intake passage 15a and the high-pressure intake passage 15b extends so as to coincide with each other in the vertical direction V, which direction is substantially parallel to the cylinder axial direction.

According to such a configuration of the peripheral structure of engine of this embodiment, the layout of the piping of the intake system 6 can be further compact.

FIGS. 4 to 8 illustrate a configuration of surroundings of the air bypass valve 200 in the peripheral structure of engine.

The intake system 6 of this embodiment includes the air bypass valve 200. The air bypass valve 200 is configured to allow the air to flow into the low-pressure intake passage 15a when the high-pressure air in the high-pressure intake passage 15b is increased to a predetermined pressure.

The air bypass valve 200 of this embodiment is attached on a part of the low-pressure intake passage 15a facing the engine main body 1.

Figure 8:
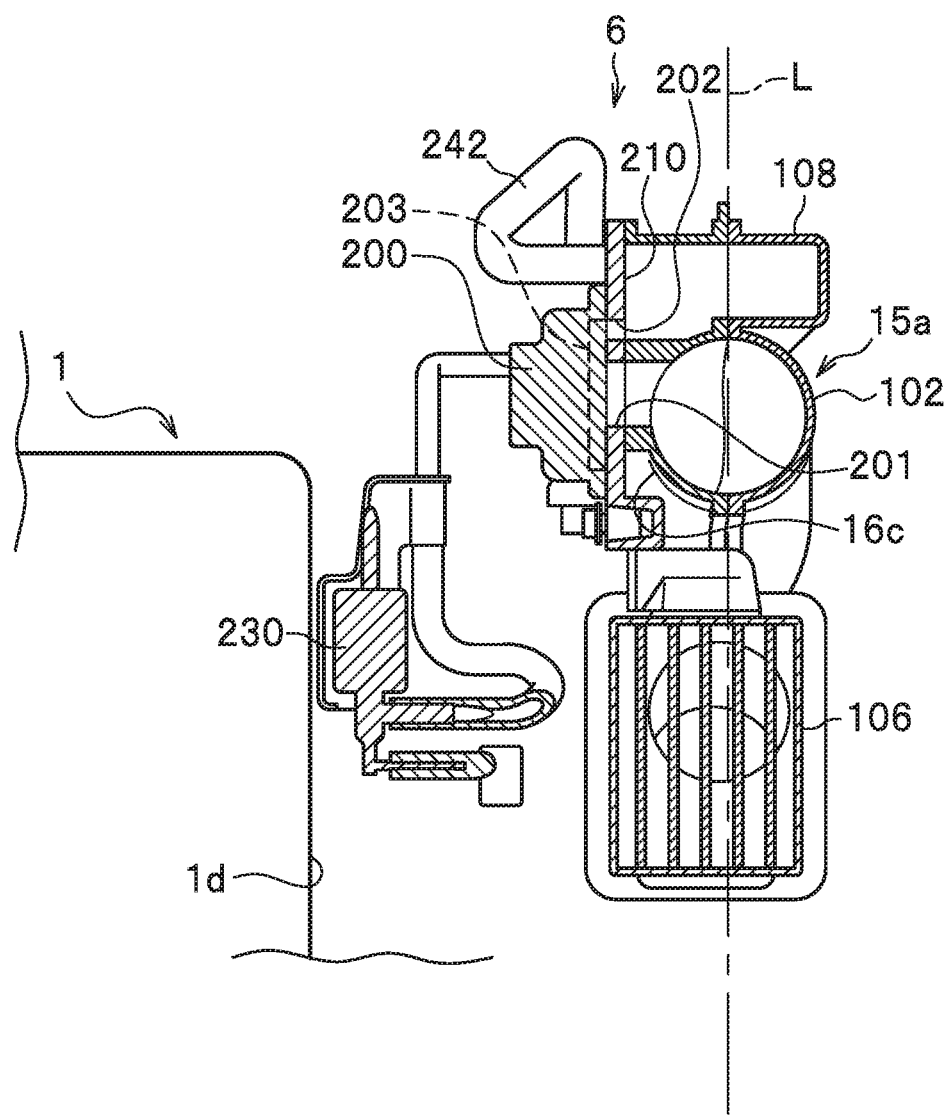
FIG. 8 is a perspective view of the peripheral structure of engine, the view illustrating the configuration of inside of the air bypass valve at a position along the VIII-VIII line in FIG. 1.

As illustrated in FIG. 8, in a cross-sectional view in a direction orthogonal to the intake air flow direction of the low-pressure intake passage 15a, a whole body of the air bypass valve 200 is provided in a region of the low-pressure intake passage 15a on the engine main body 1 side of an imaginary line L, which passes through the center of the low-pressure intake passage 15a and is parallel to the cylinder axial direction of the engine main body 1.

Figure 6:
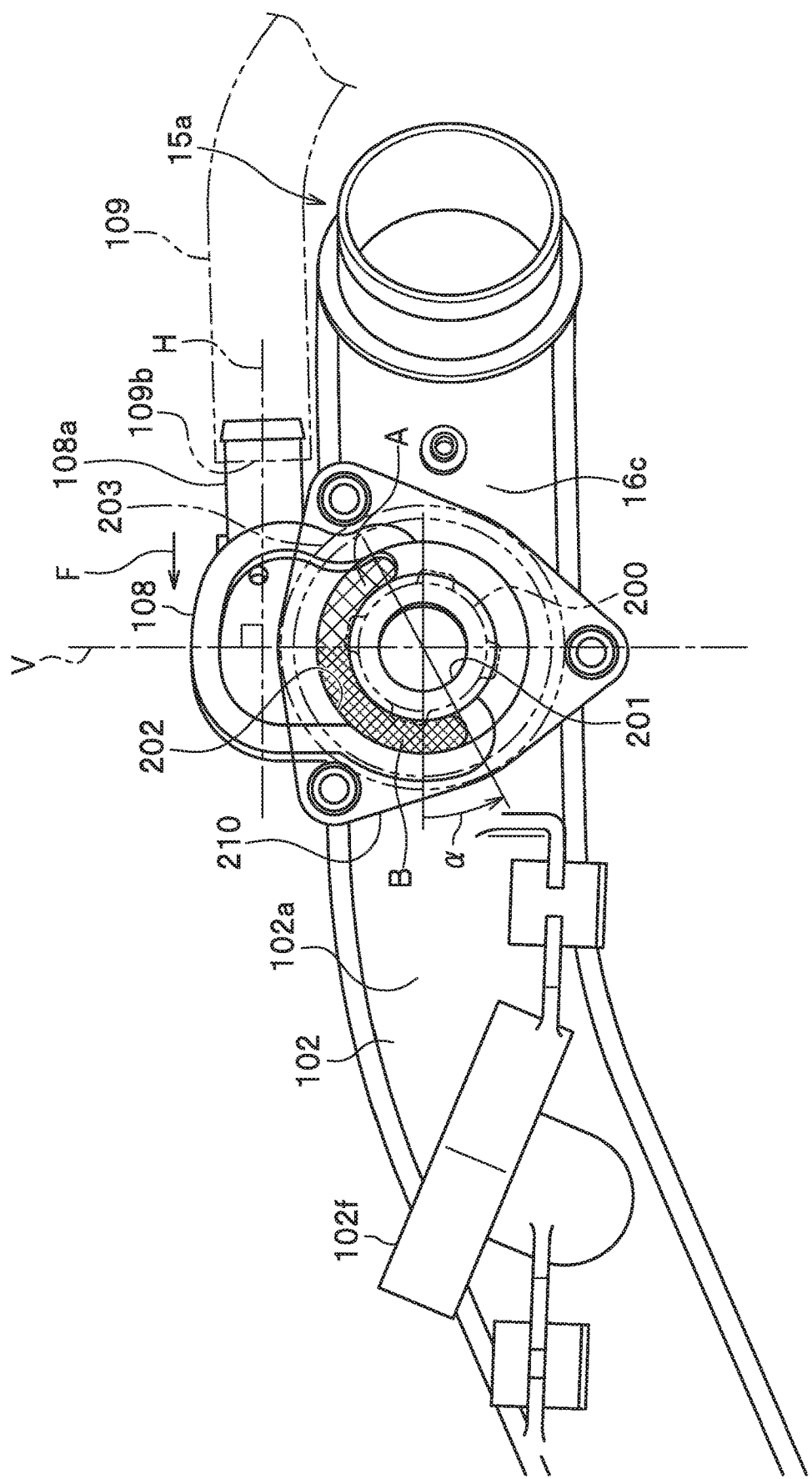
FIG. 6 is a perspective view of the peripheral structure of engine, the view illustrating a construction of inside of the air bypass valve at a position along the VI-VI line in FIG. 4.

The chamber 108 is provided in a position on the top surface side of the low-pressure intake passage 15a to face the engine main body 1. As illustrated in FIG. 6, the chamber 108 is provided with a pipe-shaped joint portion 108a protruding therefrom with the axis in the vehicle-front direction.

The joint portion 108a is connected with the end of the bypass piping 109. Thus, an internal space of the chamber 108 communicates with an internal space of the high-pressure intake passage 15b.

In addition, as illustrated in FIG. 4, an end surface of the chamber 108 at a position facing the engine main body 1 is connected with the air bypass valve 200 via the connection plate member 210.

As illustrated in FIG. 6, the air bypass valve 200 has an exit side opening 201 connected to the upper piping 102 of the low-pressure intake passage 15a, an air introducing hole 202 formed around the exit side opening 201 as an opening and communicating with the chamber 108, and an open-close valve 203 that opens and closes the exit side opening 201 and the air introducing hole 202 depending on the pressure difference between inside and outside the surface.

The air introducing hole 202 is provided to extend in a peripheral direction around the exit side opening 201, having a long hole shaped in a semi-circle with an open upper edge (about 180 degrees).

Provided that the air introducing hole 202 is divided into one region A and the other region B by an imaginary line V as their boundary, which is orthogonal to the axis H of the bypass piping 109 in the joint portion 108a, i.e., a connector between the chamber 108 and the bypass piping 109, and is passing through the center of the exit side opening 201, an area of the one region A on a connector side is smaller than an area of the other region B on the opposite side from the connector.

That is, the air introducing hole 202 is rotated by an angle α about the exit side opening 201 in a connection direction F to be offset such that, the area of the other opening region B with the imaginary line V as the boundary is increased.

Specifically, in the air introducing hole 202, an opening range is offset by the angle α in a flow direction of the air introduced as a vortex from the chamber 108 (a counter-clockwise direction in the drawing). The center of the rotation coincides with the center position of the exit side opening 201.

Figure 7:
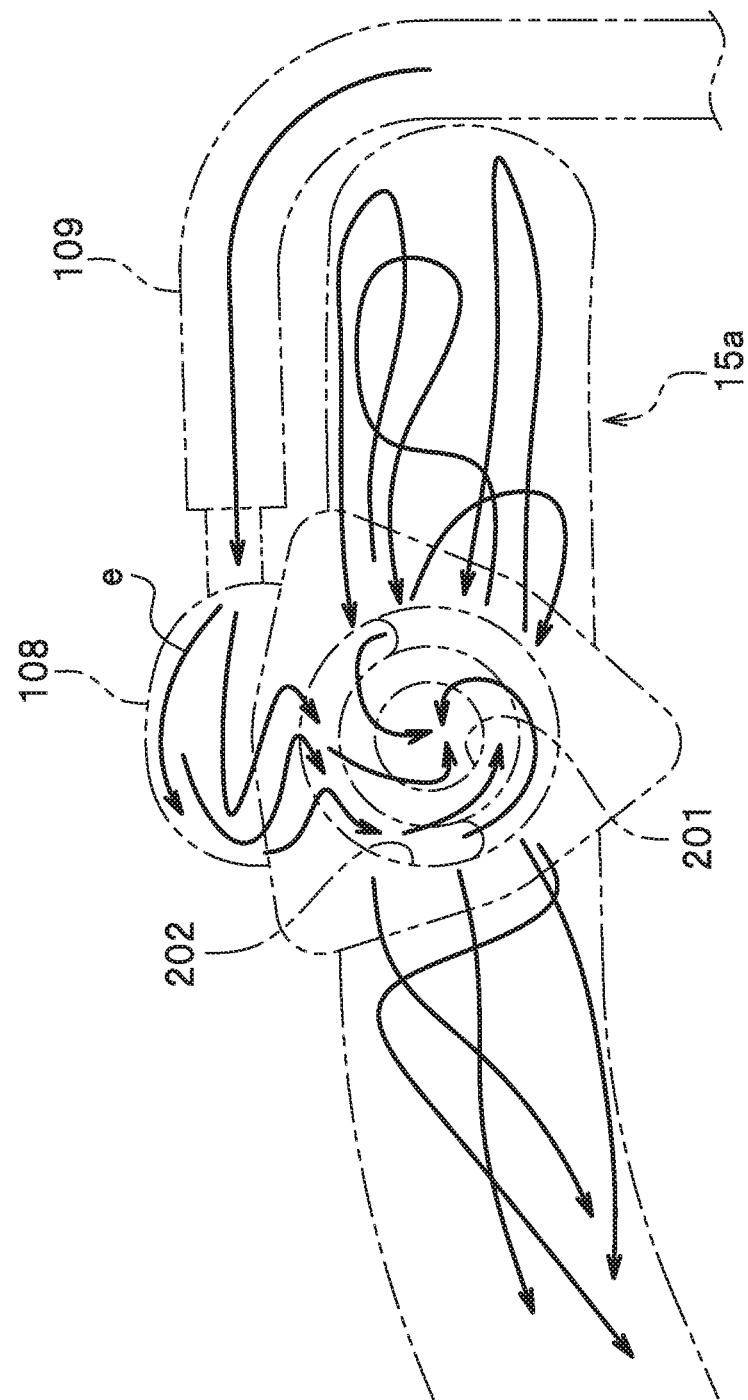
FIG. 7 is a diagram that illustrates lines of a flow of the air flowing into the air bypass valve.

Thus, as illustrated in FIG. 7, air e flowing into the chamber 108 from the bypass piping 109 becomes a swirl flow and is smoothly circulated into the low-pressure intake passage 15a when passing through the air bypass valve 200 from the chamber 108 to pass through the air introducing hole 202 and the exit side opening 201 opened by the open-close valve 203.

As illustrated in FIG. 8, a solenoid 230 for pressure control is provided between the left side surface 1d of the engine main body 1 and the intake system 6.

Figure 5:
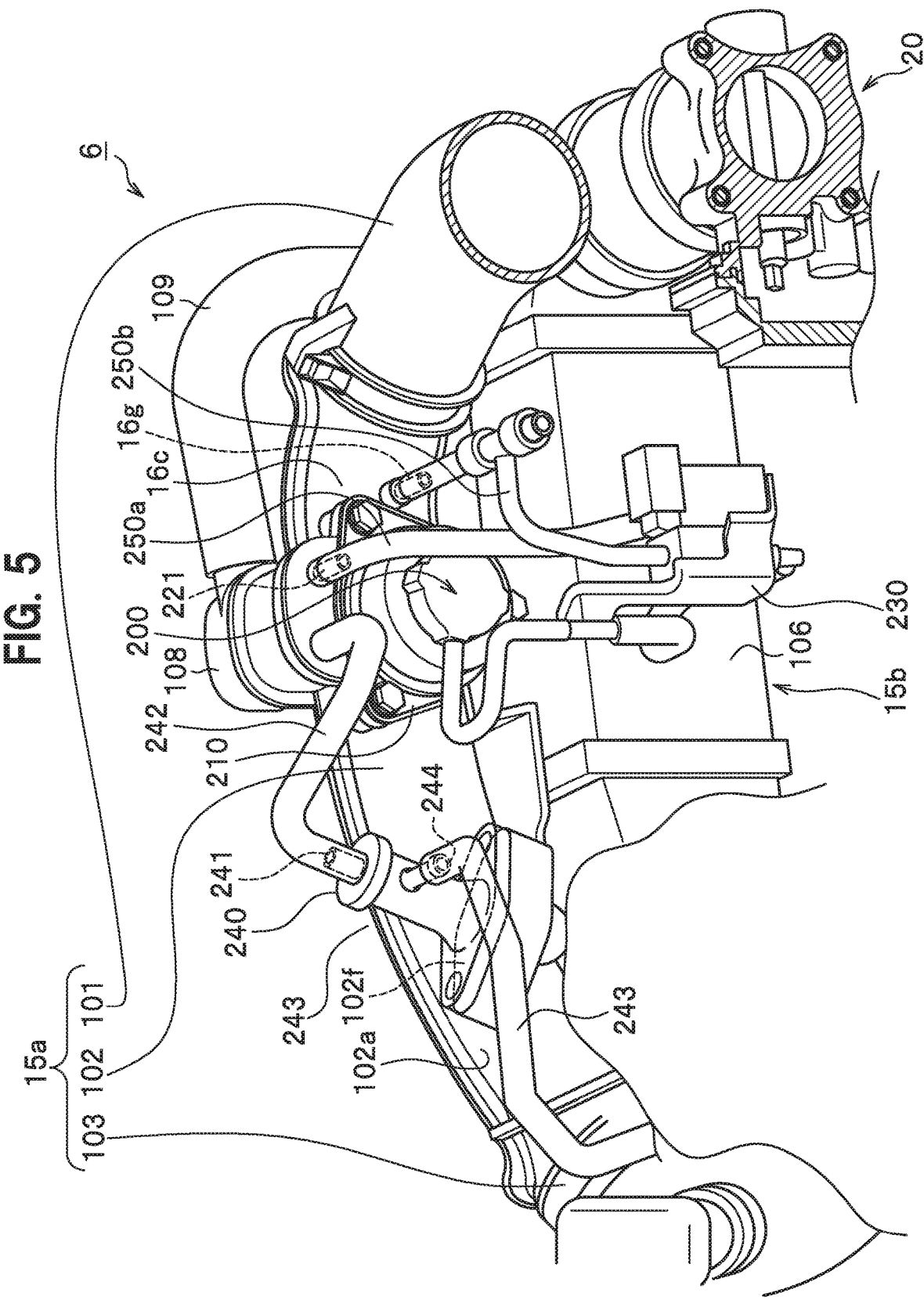
FIG. 5 is a perspective view of the peripheral structure of engine, the view illustrating a configuration of surroundings of an air bypass valve seen from an engine main body side.

A connection joint 221 that delivers pressure from the high-pressure intake passage 15b side is provided on the engine main body 1 side of the chamber 108 (see FIG. 5).

The connection joint 221 is arranged next to a joint 16g provided in the low-pressure intake passage 15a.

In addition, as illustrated in FIG. 5, a seat portion 102f with a flat top surface is formed on a side surface 102a of the upper piping 102 on the engine main body 1 side. A jet purge device 240 is fixed on the seat portion 102f. The jet purge device 240 is integrally formed with a high-pressure side joint 241 and a purge side joint 244.

A high-pressure piping 242 that delivers pressure from the chamber 108 extends from a connection plate member 210 to which the air bypass valve 200 is fixed.

The tip end of the high-pressure piping 242 is connected to one end side of the high-pressure side joint 241. An injection port 241a is formed in the end of a nozzle positioned on the other end side of the high-pressure side joint 241 (see FIG. 9).

The supercharger 17 is configured to circulate fuel vapor introduced from a vapor introducing pipe 243 into the low-pressure intake passage 15a during operation by generating pressure by pressurized air injected from the injection port 241a of the jet nozzle 245.

Moreover, as illustrated in FIG. 5, the solenoid 230 is provided on the engine main body 1 side of the upper piping 102 constituting the low-pressure intake passage 15a of this embodiment.

The solenoid 230 of this embodiment overlaps with the air bypass valve 200 near the air bypass valve 200 in the vehicle front-rear direction, and is provided at a different lower position in the vehicle vertical direction (see FIG. 8).

As illustrated in FIG. 5, the side surface 16c of the engine main body side near the air bypass valve 200 of the upper piping 102 is integrally provided with the joint 16g protruding therefrom.

The solenoid 230 is connected to the connection joint 221 via a high-pressure deriving piping 250a. The solenoid 230 is connected to the joint 16g via a low-pressure deriving piping 250b. The solenoid 230 is connected to the air bypass valve 200 via a piping 250c.

Meanwhile, an unillustrated ECU determines whether to open or close the air bypass valve 200 based on information such as detected values from a pressure sensor 301 (T-MAP sensor) and the like provided upstream and downstream of the throttle valve 20 and a valve position of the throttle valve 20.

The solenoid 230 opens the air bypass valve 200 (sends a negative pressure) or closes the air bypass valve 200 (sends a positive pressure) based on the determination of the ECU.

As illustrated in FIGS. 4 to 8, in this embodiment, the air bypass valve 200 is fixed on a part of the low-pressure intake passage 15a facing the engine main body 1. This can reduce the outward protrusion of the air bypass valve 200 from the engine main body 1.

In this embodiment, the chamber 108 connected on the outside of the air bypass valve 200 fixed on the engine main body 1 side of the low-pressure intake passage 15a as illustrated in FIG. 4 and the bypass piping 109 overlap with the low-pressure intake passage 15a in the vehicle-width direction. These chamber 108 and bypass piping 109 thus reduce the outward protrusion of the air bypass valve 200.

In this way, the space-effective valve arrangement with the compact layout is provided.

As illustrated in FIG. 8, the air bypass valve 200 is provided nearer the engine main body 1 in relation to the center L of the low-pressure intake passage 15a. In this embodiment, in a cross-sectional view in a direction that the air bypass valve 200 is orthogonal to the intake air flow direction of the low-pressure intake passage 15a, all the parts of the air bypass valve 200 are provided in a region of the low-pressure intake passage 15a on the engine main body 1 side of the imaginary line L, which is passing through the center of the low-pressure intake passage 15a and is parallel to the cylinder axial direction of the engine main body 1.

That is, the air bypass valve 200 is arranged between a side surface portion of the low-pressure intake passage 15a and the left side surface 1d of the engine main body 1. This prevents the entire air bypass valve 200 and a part of the chamber 108 from protruding outward from the imaginary line L positioned at the center of the low-pressure intake passage 15a. Thus, a more space-effective valve arrangement can be provided.

The chamber 108 is provided with the connection joint 221 that delivers the high-pressure intake air to the engine main body 1 side.

The high-pressure deriving piping 250a connected to the chamber 108 as illustrated in FIG. 5 is arranged next to the low-pressure deriving piping 250b connected to the low-pressure intake passage 15a.

Thus, the high-pressure deriving piping 250a and the low-pressure deriving piping 250b can be routed in the shortest distance from the various sensors such as the solenoid 230 that require the intake air from the high-pressure side and the low-pressure side, and the layouts can be simple and compact.

As illustrated in FIG. 6, the air introducing hole 202 is divided into one region A and the other region B by the imaginary line V as their boundary, which is orthogonal to the axis H of the bypass piping 109 in the joint portion 108a, i.e., a connector between the chamber 108 and the bypass piping 109, and is passing through the center of the exit side opening 201, the area of the one region A on the connector side is smaller than the area of the other region B on the opposite side from the connector.

The air introducing hole 202 is provided to extend in the peripheral direction around the exit side opening 201, having the long hole shaped in a semi-circle with the open upper edge (about 180 degrees).

This allows the air introduced via the chamber 108 to be circulated to the low-pressure intake passage 15a with a small airflow resistance while generating a swirl flow through the long hole shaped air introducing hole 202.

Thus, the smooth air flow can reduce the time loss in releasing the air from the air bypass valve 200.

As illustrated in FIG. 5, the seat portion 102f of the jet purge device 240 is provided on the upper piping 102 constituting the low-pressure intake passage 15a of this embodiment. This can make the piping layout easier.

In addition, as illustrated in FIG. 8, the solenoid 230 controlling the air bypass valve 200 is provided nearer the engine main body 1 side in relation to the upper piping 102. The solenoid 230 controls opening and closing of the air bypass valve 200 based on the opening and closing information, which is determined in the unillustrated ECU using the information such as the detected value from the T-MAP sensor and the like provided in the up-down-stream of the throttle valve 20 and a valve position of the throttle valve 20.

That is, the solenoid 230 is connected with the joint 16g provided near the air bypass valve 200 on the side surface of the upper piping 102 facing the engine main body 1 and the connection joint 221 via the respective low-pressure deriving piping 250b and high-pressure deriving piping 250a.

This allows the solenoid 230 to be connected in a short distance with each of the high-pressure deriving piping 250a for drawing the high-pressure air and the low-pressure deriving piping 250b for drawing the low-pressure air.

Thus, layout of the piping from the solenoid 230 to the air bypass valve 200 can be simple and compact, and, for example, the responsiveness of the air bypass valve 200 controlled by the solenoid 230 can be improved.

Figure 9:
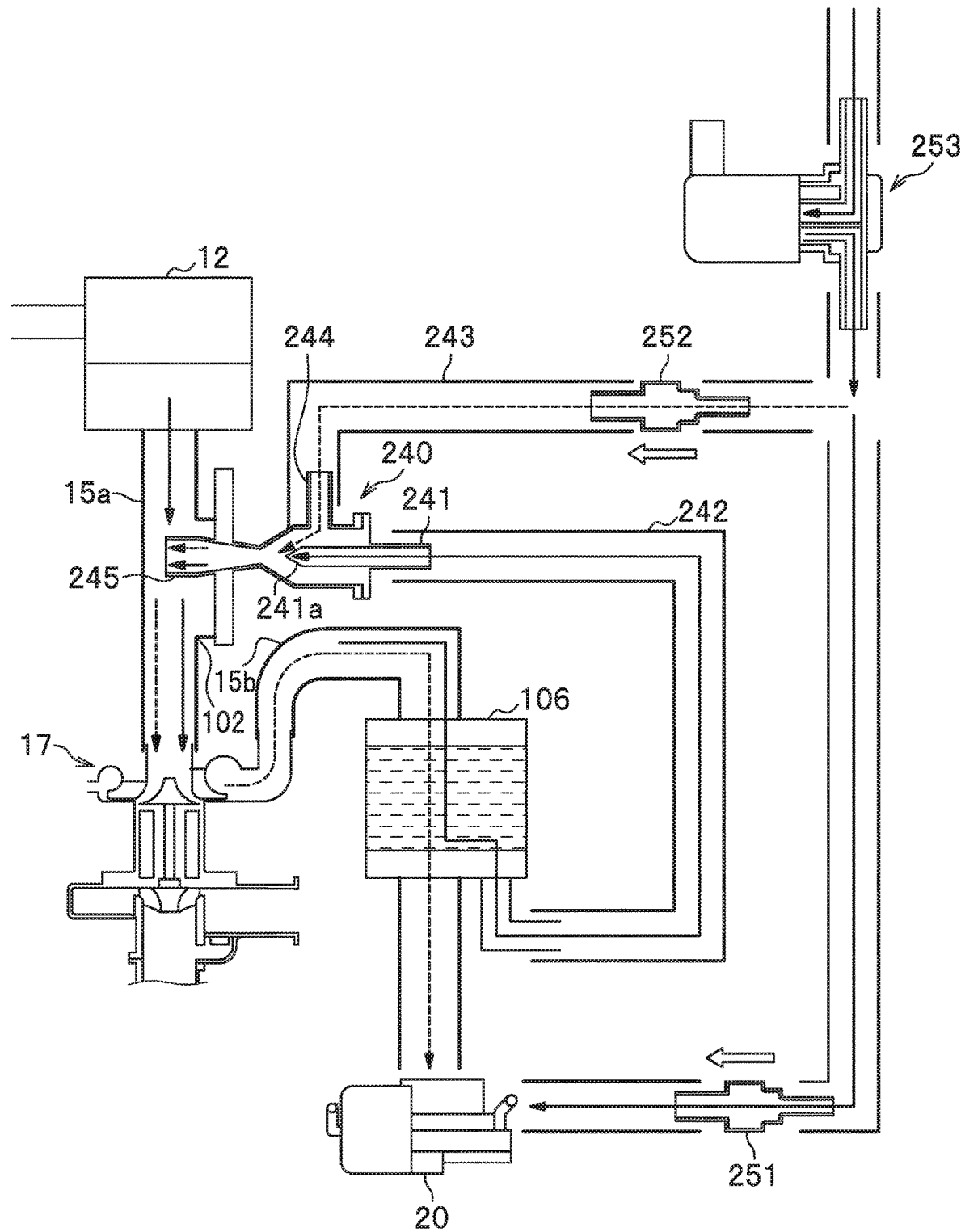
FIG. 9 is a circuit diagram of the peripheral structure of engine, the diagram illustrating an intake system and a flow of vapor.

Next, the intake system 6 and a flow of the vapor of this embodiment are described with reference to FIG. 9.

In a state where no supercharging is performed by the supercharger 17, the first check valve 251 is opened and the second check valve 252 is closed.

The vapor sucked from an unillustrated canister passes through a purge control valve 253 and is sent to the throttle valve 20 via the first check valve 251. The vapor is mixed with the air in the throttle valve 20 and then combusted in the engine main body 1.

On the other hand, once the supercharger 17 starts operation, the supercharged air is supplied to the throttle valve 20 via the intercooler 106. Concurrently, the air supercharged by the supercharger 17 is also sent to the jet purge device 240 with a predetermined pressure.

During the supercharging by the supercharger 17, the first check valve 251 is closed to prevent a backflow due to drawing of the high-pressure air, while the second check valve 252 is opened. The vapor passes through the purge control valve 253 and the second check valve 252 and is sucked by the jet purge device 240.

The vapor circulated into the low-pressure intake passage 15a from the vapor introducing pipe 243 is compressed again by the supercharger 17 with a force of the air supercharged by the supercharger 17 and is sent to the throttle valve 20 via the intercooler 106. The vapor is mixed with the air in the throttle valve 20 and combusted in the engine main body 1.

In this way, the purge can be continuously performed even in the supercharging performed by the supercharger 17.

FIGS. 10 to 13 are diagrams that illustrate surroundings of the engine and illustrate a structure of a periphery of an exit portion of the intercooler 106.

This embodiment includes the throttle valve 20 connected to the piping of the intake system 6 of the engine main body 1, the pressure sensor 301 provided on an upstream side of the throttle valve 20 in the piping of the intake system 6, and the intercooler 106.

The piping of the intake system 6 consists of an intake duct having one or more curved parts that bend or curve. In the top view of the engine room 11, the pressure sensor 301 is provided in the fourth connection member 107 near the outside curved portion of the last curved part on the downstream side of the intake duct.

Figure 10:
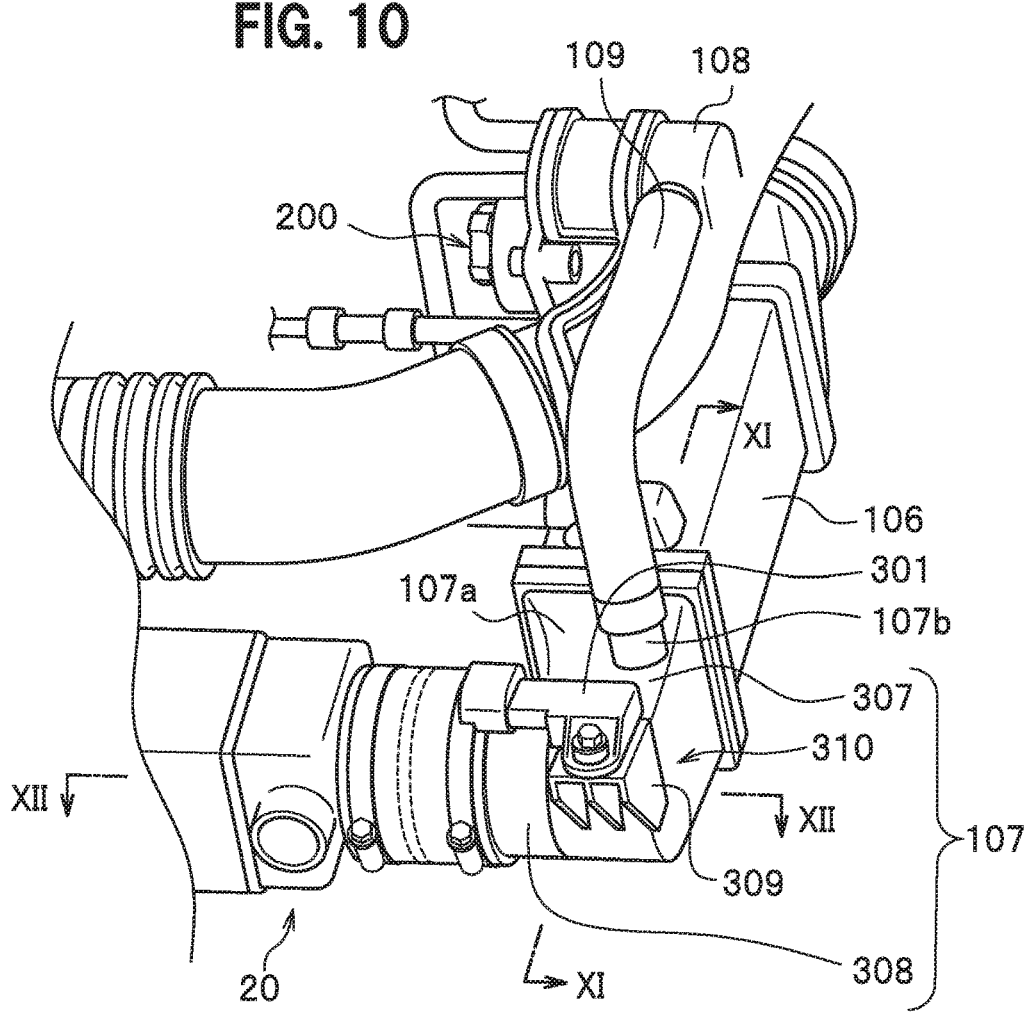
FIG. 10 is a perspective view of the peripheral structure of engine, the view seeing a sensor attachment portion from above the vehicle in the diagonal direction.

As illustrated in FIG. 10, the fourth connection member 107 has a rectangular tube portion 307 connected to the exit portion of the intercooler 106 and a cylinder portion 308 connected to the throttle valve 20.

Each of these rectangular tube portion 307 and cylinder portion 308 is hollow and has an intake passage therein.

Following the arrangement of the intercooler 106 and the throttle valve 20, the rectangular tube portion 307 and the cylinder portion 308 are integrally formed such that their axial directions are orthogonal to each other at 90 degrees.

Figure 11:
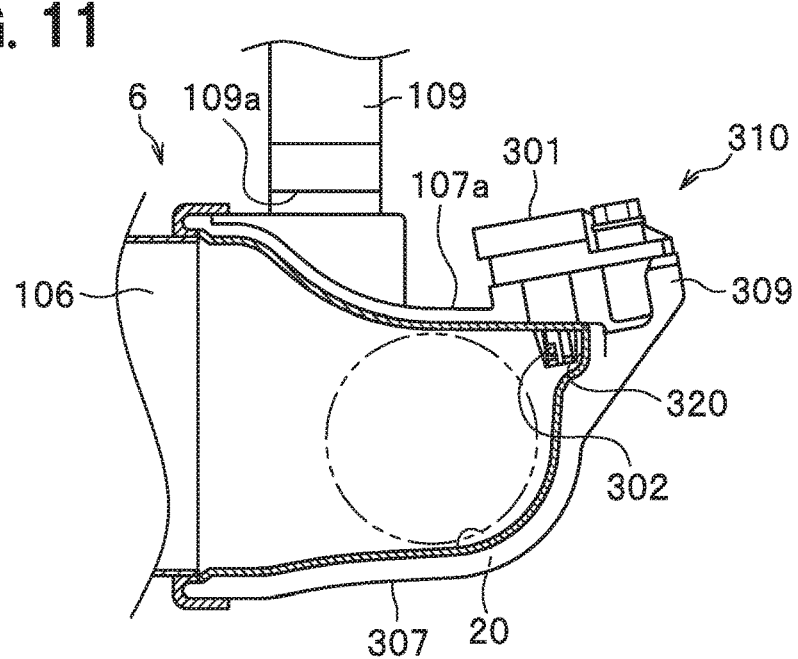
FIG. 11 is a cross-sectional view of the peripheral structure of engine, the view illustrating a configuration of an exit portion periphery of an intercooler at a position along the XI-XI line in FIG. 10.

Out of these, as illustrated in FIG. 11, the rectangular tube portion 307 has a pyramid shape such that an area of a channel cross-section is decreased toward the downstream side in a flow direction (right direction in the diagram).

A protrusion portion 309 positioned on the vehicle-front side of this rectangular tube portion 307 is provided with an attachment portion 310 on which the pressure sensor 301 is attached.

Figure 13:
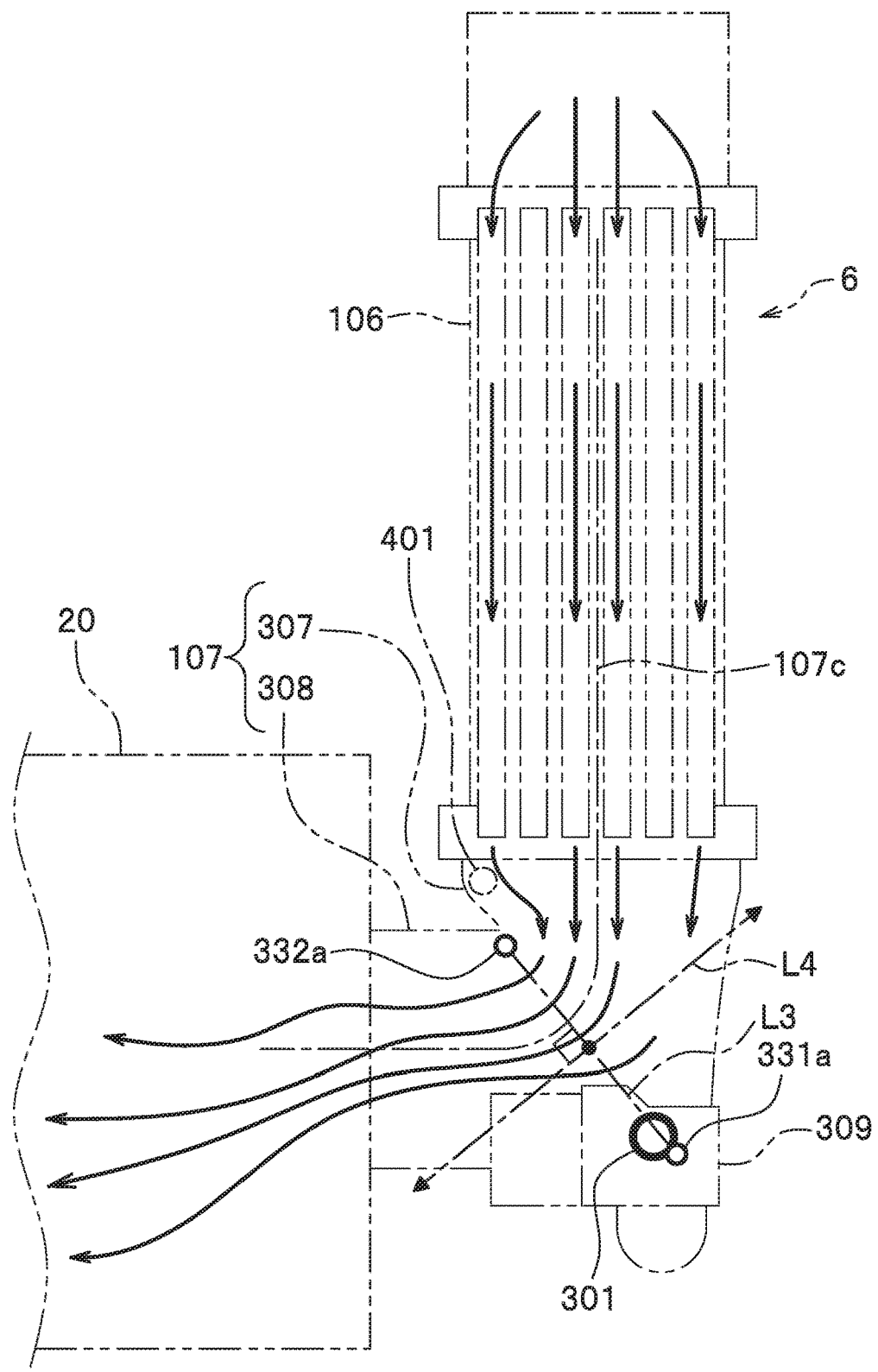
FIG. 13 is a schematic diagram that illustrates a flow of the air in the exit portion periphery of the intercooler at a position corresponding to FIG. 12.

In addition, in this embodiment, as illustrated in FIG. 13, assuming that there is an imaginary perpendicular bisector L4 of a line L3, which connects a vertex 331a of the outside curved portion and a vertex 332a of an inside curved portion of the curved part 330, the pressure sensor 301 is attached near the vertex 331a side on the outside curved portion side of this imaginary perpendicular bisector L4.

In this embodiment, as illustrated in FIG. 13, when the curvature of the outside curved portion of the curved part 330 is constant, the imaginary line is drawn based on the center point of the starting point and the ending point of the curvature of the outside curved portion. In addition, when the curvature of the inside curved portion of the curved part 330 is constant, the imaginary line may be drawn based on the center point of the starting point and the ending point of the curvature of the outside curved portion.

The pressure sensor 301 is attached near the vertex 331a side on the outside curved portion side of this center point as the reference.

As illustrated in FIG. 11, a detector 302 is a protrusion portion, which is protruding in a direction different from a direction facing the throttle valve in a front view of an upstream part in the intake direction from the throttle valve 20. The detector 302 is stored in a concaved space 320 of the curved part 330 while being provided on the outer side of an outside wall line 333. This configuration prevents the backflow air from directly hitting the detector 302.

Figure 12:
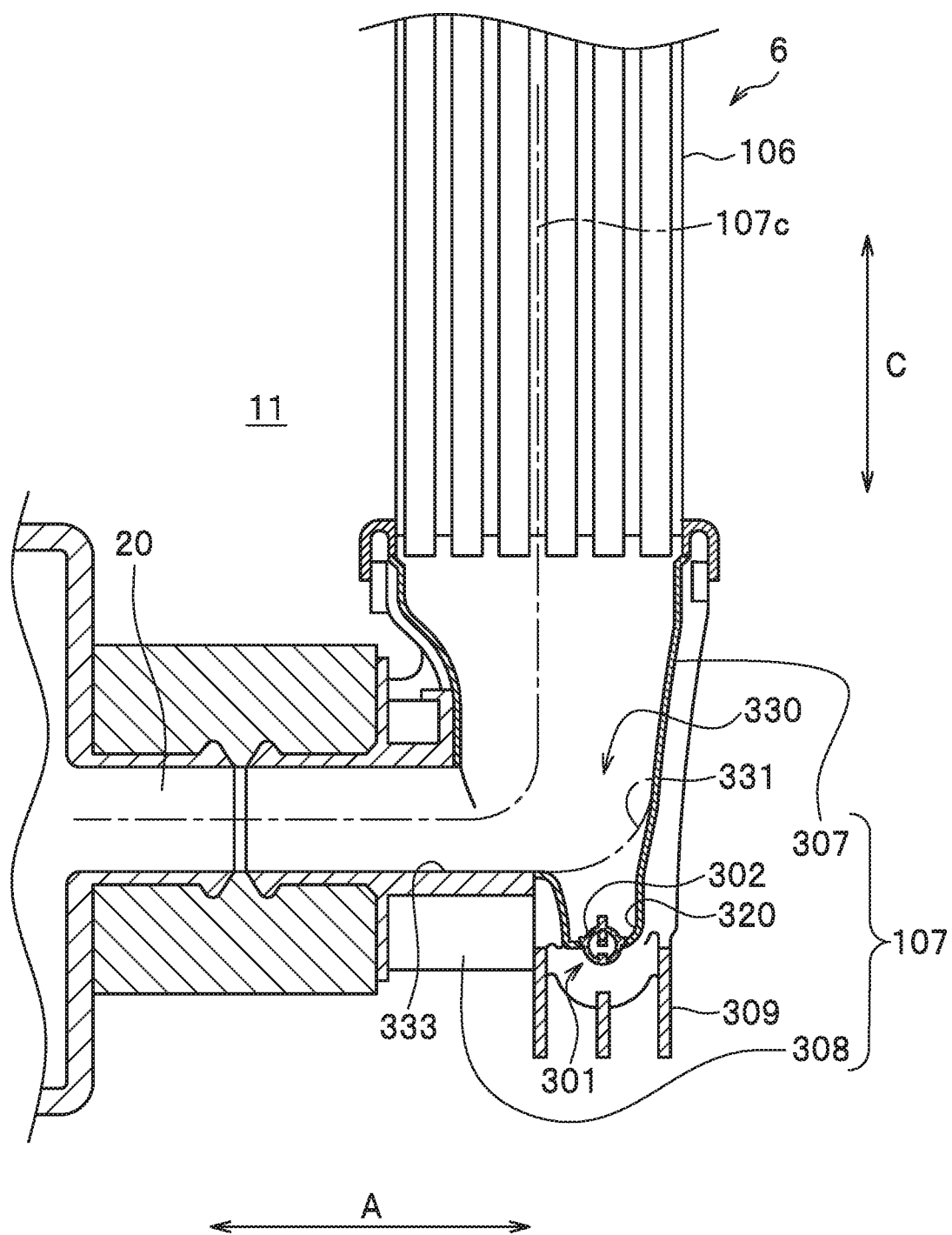
FIG. 12 is a cross-sectional view of the peripheral structure of engine, the view illustrating a configuration of the exit portion periphery of the intercooler at a position along the XII-XII line in FIG. 10.

That is, in other words, the curved part 330 is provided at a downstream end of the intake duct as illustrated in FIG. 12, or at a position that does not overlap with the internal space of the throttle valve 20 when projecting the detector 302 on the downstream side in the intake direction along the center axis in a pipe-length direction of the throttle valve 20. The detector 302 is provided on the outer side of the outside wall line 333 of the cylinder portion 308.

As illustrated in FIG. 12, the detector 302 of the pressure sensor 301 is arranged near the outside curved portion 331 in the curved part 330. The fourth connection member 107 is provided at the lowermost downstream position in the intake direction of the piping of the intake system 6. The curved part 330 is positioned in the fourth connection member 107 in the top view of the engine room 11.

In this embodiment, the detector 302 is provided inside the concaved space 320. This allows the detector 302 to accurately detect the air pressure in the intake duct at an outside position where the detector 302 can avoid receiving the main stream of the intake air sent from the exit portion of the intercooler 106.

In addition, the detector 302 of this embodiment is provided in the protrusion portion 309. In the top view of the engine room 11, the protrusion portion 309 protrudes in a direction different from a direction facing the throttle valve 20 outward from the piping of the intake system 6 in a radial direction of an arc flexed at the outside curved portion 331 of the curved part 330.

Next, operations and effects of the intake system pressure sensor arrangement structure of this embodiment are described.

According to such a configuration of the vehicle 10 of this embodiment, the concaved space 320 provided to be concaved in the protrusion portion 309 can reduce the protrusion from the inside surface of the piping of the pressure sensor 301 toward the main stream of the air flowing through the piping of the intake system 6.

For example, the detector 302 does not protrude in an in-pipe direction further than the position of the inside surface of the throttle valve 20 as illustrated in FIG. 11 and the outside wall line 333 and the outside curved portion 331 in the curved part 330 as illustrated in FIG. 12.

As described above, since the pressure sensor 301 is routed to be away from the main stream of the intake air, the pressure sensor 301 is hardly affected by the change of the pressure due to the backflow even when the intake air flows backward in the piping of the intake system 6 when, for example, the throttle valve 20 is suddenly closed.

Although being stored in the concaved space 320, the detector 302 can accurately detect the air pressure in the intake duct without receiving the main stream of the intake air sent from the exit portion of the intercooler 106 head-on as illustrated in FIG. 12.

Thus, the accurate pressure can be effectively detected.

The detector 302 of the pressure sensor 301 attached on the inside surface on the upper side constituting the concaved space 320 as illustrated in FIG. 11 is fixed to be tilted in a different direction from the throttle valve 20 on the outside curved portion 331 side of the imaginary perpendicular bisector L4 as illustrated in FIG. 13. This allows the detector 302 to be space-effectively stored in the concaved space 320 without protruding.

As described above, the detector 302 in the concaved space 320 is attached at an angle that makes the detector 302 away from the main stream of the intake air and can avoid direct hitting of the backflow air. Thus, the effect of the backflow air caused by immediate opening of the throttle valve 20 can be reduced and also the required air pressure in the intake duct can be accurately detected.

In addition, as illustrated in FIG. 13, when the curvature of the outside curved portion of the curved part 330 is constant, the center point of the starting point and the ending point where the curvature of the outside curved portion occurs is the reference point of the imaginary line.

The pressure sensor 301 is attached near the vertex 331a side on the outside curved portion side of the reference of this center point. In this embodiment, as illustrated in FIG. 12, the detector 302 is provided outside of the outside wall line 333. This prevents the main stream of the backflow air from directly hitting the pressure sensor 301 provided in a region where a flow rate is low, even when the intake air flows backward through the piping of the intake system 6. Thus, the detector 302 is hardly affected by the backflow air through the curved part 330 and also can detect accurate pressure.

In particular, in this embodiment, making the imaginary perpendicular bisector L4 by connecting the vertex 331a of the outside curved portion of the curved part 330 and the vertex 332a of the inside curved portion as illustrated in FIG. 13, the pressure sensor 301 is attached near the vertex 331a side of the outside curved portion of this imaginary perpendicular bisector L4.

In addition, when the curvature of the outside curved portion of the curved part 330 is constant like this embodiment, the center point of the starting point and the ending point where the curvature occurs is the reference of the imaginary line.

Thus, moreover, the detector 302 can detect further accurate pressure by attaching the pressure sensor 301 while setting the concaved space 320 in a distant position from the reference point where is hardly affected by the backflow air.

Further, as illustrated in FIG. 12, using the detector 302 arranged near the outside curved portion 331 in the curved part 330 at the lowermost downstream position in the intake direction, accurate air pressure in the intake duct immediately before the air flows into the throttle valve from the intake system 6.

Furthermore, in this embodiment, the detector 302 is provided in the protrusion portion 309 protruding outward of the intake system 6 from the outside curved portion 331 of the curved part 330 in the top view of the engine room 11 mounted with the engine main body 1.

This prevents the main stream from directly hitting the pressure sensor 301 even when the intake air flows backward through the piping of the intake system 6. Thus, the detector 302 is hardly affected by the backflow air through the piping of the intake system 6 and can measure the accurate pressure.

The present invention is not limited to the above embodiments, and various modifications are possible. The above embodiments are exemplified for clearly describing the present invention and are not necessarily limited to the embodiments including all of the described configurations. A part of a configuration of one embodiment can be replaced with a configuration of another embodiment, and a configuration of one embodiment can additionally include a configuration of the other embodiment. A part of a configuration of each embodiment can be deleted, and a configuration of the other embodiment can be added to or replaced with that of each embodiment. Available modifications for the above embodiments are below, for example.

In the peripheral structure of engine of this embodiment, at least a part of each of the low-pressure intake passage 15a and the high-pressure intake passage 15b turned back at the supercharger 17 provided in the middle of the intake system 6 extends to coincide with each other in the vertical direction V and is arranged on the left side surface 1d of the engine main body 1.

However, it is not limited thereto. The low-pressure intake passage 15a and the high-pressure intake passage 15b may be arranged on a right side surface or on a front-rear side surface of the engine main body 1, for example. Otherwise, the low-pressure intake passage 15a and the high-pressure intake passage 15b may be arranged to across adjacent multiple side surfaces.

That is, the side surface on which the low-pressure intake passage 15a and the high-pressure intake passage 15b are arranged may be any side surface of the engine main body 1.

In the high-pressure intake passage 15b, the intercooler 106 is interposed between the third connection member 105 and the fourth connection member 107; however, it is not limited thereto. The intercooler 106 may be arranged in a different place or no intercooler 106 may be provided.

In addition, the position in the vertical direction V of the fourth connection member 107 positioned at the exit portion of the intercooler 106 is set to be the same position as the position in the vertical direction V of the throttle valve 20; however, it is not limited thereto. The position in the vertical direction V of the throttle valve 20 may be different from the position of the exit portion of the intercooler 106.

The low-pressure intake passage 15a has the air bypass valve 200 above the part overlapped with the high-pressure intake passage 15b in the top view; however, it is not limited thereto. The position of the air valve 200 may be anywhere such as below the part overlapped with the high-pressure intake passage 15b in the top view, and the proportion of the overlap is not particularly limited.

Moreover, one end 109a of the bypass piping 109 is connected to the top surface portion 107a of the fourth connection member 107 arranged on the downstream side in the intake direction of the intercooler 106; however, it is not limited thereto. For example, one end 109a may be connected to any part of the high-pressure intake passage 15b as long as the high-pressure intake air can be supplied to the air bypass valve 200 from the high-pressure intake passage 15b.

In this embodiment, the low-pressure intake passage 15a and the high-pressure intake passage 15b extend such that the whole parts thereof coincide with each other in the top view of the engine room 11; however, it is not limited thereto. For example, at least a part of the low-pressure intake passage 15a only needs to extend to overlap with the high-pressure intake passage 15b on at least one side surface such as the left side surface 1d, and thus, the shape, the number and the material of the low-pressure intake passage 15a and the high-pressure intake passage 15b are not particularly limited.

In the valve arrangement of this embodiment, the air bypass valve 200 is fixed to a part facing the engine main body 1 of the low-pressure intake passage 15a as illustrated in FIG. 8.

However, it is not particularly limited thereto. For example, the air bypass valve 200 only needs to be provided on the lower side of the low-pressure intake passage 15a, or to be fixed to the side surface 16c on the engine main body 1 side of the low-pressure intake passage 15a, and the shape, the number and the material of the air bypass valve 200 are not particularly limited.

A size d1 of the diameter of the chamber 108 is set to be greater than a size d2 of the diameter of the bypass piping 109 (d1>d2) as illustrated in FIG. 4; however, it is not limited thereto. No chamber 108 may be provided, and the shape, the number and the size of the chamber 108 are not particularly limited.

Further, as illustrated in FIG. 6, the air introducing hole 202 is provided to extend in the peripheral direction around the exit side opening 201, having the long hole shaped in a semi-circle with the open upper edge (about 180 degrees), and the opening range is offset at the angle α=30 degrees.

However, the air introducing hole 202 is not particularly limited to the above. The air introducing hole 202 may have the opening range having an angle α=0 to 180 degrees and offset in the air flow direction (the counterclockwise direction in the drawing). In other words, the air introducing hole 202 may have the opening range in which the direction F side defined by the imaginary line V is larger than the other side, where the imaginary line V denotes a line which passes through the center of the exit side opening 201 and is orthogonal to the axial direction H of the bypass piping 109 connected to the chamber 108 and the direction F denotes the direction in which the bypass piping 109 connects to the low-pressure intake passage 15a. That is, the shape, the number and the size of the air introducing hole 202 are not particularly limited as long as the area of the one region A on the connector side is smaller than the area of the other region B on the opposite side from the connector, where the air introducing hole 202 is divided into the one and the other regions A and B by the imaginary line V, as their boundary, which is orthogonal to the axial direction H of the bypass piping 109 in the joint 108a, i.e., a connector between the chamber 108 and the bypass piping 109, and is passing through the center of the exit side opening 201.

Also, the positions of the connection joint 221, the seat portion 102f to which the jet purge device 240 is fixed, the joint 16g, and the like are not particularly limited. For example, they may be provided in any way as long as the position can make short piping, desirably in the shortest distance, to implement effective wiring.

In the intake system pressure sensor arrangement structure in this embodiment, no pressure sensor 301 is provided to protrude from the attachment portion 310 provided to be concaved in the protrusion portion 309; however, it is not particularly limited thereto. The position of the concaved space 320 in which the pressure sensor 301 is provided may not be limited as long as the position is near the outside curved portion 331 of the curved part.

That is, even when the pressure sensor 301 is provided in a straight pipe portion instead of the curved part, the shape and the size of the concaved space 320 in which the detector 302 of the pressure sensor 301 is provided are not particularly limited as long as the pressure sensor 301 is positioned in the concave.

Even when the concaved space 320 is not provided, the position of the pressure sensor 301 may be anywhere outside of the outside wall line 333 as long as the detector 302 cannot be seen when looking at the upstream side in the intake direction along the axis direction of the throttle valve 20. Furthermore, for example, the configuration may be like a case of a pressure sensor 401 illustrated in FIG. 13 that the detector is out of sight, and may be that the intake air can be measured and the backflow air is prevented from directly hitting the detector of the pressure sensor 401.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A sensor arrangement of an internal combustion engine comprising:
    an intake duct including one or more curved parts bent or curved and connecting an intercooler and a throttle; and
    a pressure sensor provided on the intake duct and configured to detect a pressure in the intake duct,
    wherein intake duct includes a protrusion portion protruding in a direction different from a direction facing the throttle in a front view of an upstream part in an intake direction from the throttle,
    wherein in a top view of an engine room the pressure sensor includes a detector which is disposed close to an outside curved portion of one curved part of the one or more curved parts and in the protrusion portion,
    wherein the detector is provided outside of an outside wall line of a downstream end of the intake duct connected to the throttle, and
    wherein the detector is disposed at an off position that does not overlap with an internal space of the throttle when being projected toward a downstream side in an intake direction along the center axis in a pipe-length direction of the throttle.

2. The sensor arrangement according to claim 1,
    wherein the curved part at the lowermost downstream position of the intake duct has an outside curved portion and an inside curved portion,
    wherein the curved part has an imaginary straight line connecting the vertex of the outside curved portion and the vertex of the inside curved portion,
    wherein the curved part has an imaginary perpendicular bisector of the imaginary straight line, and
    wherein in the top view of the engine room the pressure sensor includes an detector disposed closer to the outside curved portion than the imaginary perpendicular bisector.

3. The sensor arrangement according to claim 2,
    wherein one curved portion of the outside curved portion and the inside curved portion has a constant curvature,
    wherein said one curved portion has a starting point and an ending point of a curve, and
    wherein the center point of the starting point and the ending point is set to a reference point of the imaginary straight line.

4. The sensor arrangement according to claim 1,
    wherein the detector is fixed on an inside surface on an upper side defining a concaved space in the protrusion portion with the detector tilted in a different direction from the throttle.

5. The sensor arrangement according to claim 1,
    wherein the intake duct includes a first intake passage of a portion connecting with the intercooler, and a second intake passage of a portion connecting with the throttle, and
    wherein the curved part is between the first intake passage and the second intake passage, and
    wherein the first intake passage and the second intake passage are formed integrally with each other with axial directions of the first intake passage and the second intake passage orthogonal to each other at 90 degree.

* * * * *